United States Patent
Remington, Jr. et al.

(10) Patent No.: US 7,223,441 B2
(45) Date of Patent: May 29, 2007

(54) METHOD FOR DEPOSITING GALLIUM OXIDE COATINGS ON FLAT GLASS

(75) Inventors: Michael P. Remington, Jr., Toledo, OH (US); David A. Strickler, Toledo, OH (US); Srikanth Varanasi, Toledo, OH (US)

(73) Assignee: Pilkington North America, Inc., Toledo, OH (US)

( * ) Notice: Subject to any disclaimer, the term of this patent is extended or adjusted under 35 U.S.C. 154(b) by 510 days.

(21) Appl. No.: 10/797,450

(22) Filed: Mar. 10, 2004

(65) Prior Publication Data

US 2005/0202170 A1    Sep. 15, 2005

(51) Int. Cl.
*C23C 16/00* (2006.01)
(52) U.S. Cl. .................... 427/248.1; 427/255.23; 427/255.28
(58) Field of Classification Search ............ 427/248.1, 427/255.23, 255.28
See application file for complete search history.

(56) References Cited

U.S. PATENT DOCUMENTS 5,389,401 A * 2/1995 Gordon ................. 427/255.36
5,451,548 A   9/1995 Hunt et al.
5,474,851 A * 12/1995 Ganswein ................... 428/432
5,897,812 A   4/1999 Kitai et al.
6,238,738 B1 * 5/2001 McCurdy ............... 427/255.19
6,328,947 B1 * 12/2001 Monden et al. ............. 423/611

OTHER PUBLICATIONS

Valet, M. and Hoffman, D.M., "Synthesis of Homoleptic Gallium Oxide Complexes and the CVD of Gallium Oxide Films", Chem. Mater. 2001, 13, 2135-2143, 2001, American Chemical Society, USA.
Binions, Russell, et al., "Gallium Oxide Films from the Atmospheric Chemical Vapor Deposition Reaction of Gallium Trichloride and Methodanol", Chem. Mater., May 4, 2004, American Chemical Society, USA.

* cited by examiner

*Primary Examiner*—Timothy Meeks
*Assistant Examiner*—Kelly M. Stouffer
(74) *Attorney, Agent, or Firm*—Marshall & Melhorn, LLC

(57) ABSTRACT

A chemical vapor deposition process for laying down a gallium oxide coating on a glass substrate through the use of an organic ester and an inorganic gallium halide. The organic ester preferably contains 3-6 carbon atoms which contributes to obtaining a high deposition rate. The chemical vapor deposition method to form the gallium oxide coating is preferably at, essentially, atmospheric pressure. The resulting article has a gallium oxide coating which can be of substantial thickness because of the high deposition rates attainable. The coating deposition rates resulting from the method of the present invention are preferably greater than or equal to 75 Å per second.

14 Claims, No Drawings

METHOD FOR DEPOSITING GALLIUM OXIDE COATINGS ON FLAT GLASS

BACKGROUND OF THE INVENTION

1. Field of the Invention

This invention relates to a process for depositing gallium oxide coatings on a flat glass substrate. More particularly, this invention relates to an atmospheric chemical vapor deposition process for producing gallium oxide coatings at high growth rates on flat glass using a coating precursor gas mixture comprising a gallium halide and an organicester.

2. Summary of Related Art

Gallium oxide coatings have been used, primarily, in connection with the production of semiconductor materials, for example, as a passivation layer for GaAs semiconductor wafers. It has also been formed by various methods on glass for uses in luminescent phosphor, solar cell, and deep-ultraviolet tranparent conducting oxide applications.

An article entitled "Synthesis of Homoleptic Gallium Alkoxide Complexes and the Chemical Vapor Deposition of Gallium Oxide Films", M. Valet and D.M. Hoffman, Chem Mater, 2001, 13, 2135-2143, describes the use of low pressure chemical vapor deposition using organo-gallium and $O_2$ precursors to form $Ga_2O_3$ films at substrate temperatures of 300-700° C. Deposition rates were reported to be less than 50 Å/min, i.e., less than 0.83 Å/sec.

Other investigations utilizing low pressure chemical vapor deposition have reported forming gallium oxide films, but also at a quite low deposition rates. Examples include:

Battiston et al. Thin Solid Films, 1996, 279, 115 (Growth rates of 117 Å/min i.e., 1.95 Å/sec.)

Ballarin et al. Inorg. Chim. Acta, 1994, 217, 71 (Growth rates not reported)

Minea et al. J. Mater. Chem. 1999, 9, 929. (Growth rates less than 3800 Å/min i.e., less than 63.3 Å/sec.)

Gallium oxide thin films have also been produced using methods other than chemical vapor deposition.

U.S. Pat. No. 5,451,548 utilizes electron beam evaporation of single crystal high purity $Gd_3Ga_5O_{12}$ complex compounds to form a $Ga_2O_3$ thin film. U.S. Pat. No. 5,474,851 describes producing a gallium oxide film by reactive vapor deposition in a vacuum plus oxygen, followed by tempering. U.S. Pat. No. 5,897,812 describes producing oxide/phosphors based on doped gallium oxides using RF magnetron sputtering for electroluminescent display materials.

It would be desirable to form gallium oxide films at essentially atmospheric pressure and to produce them at deposition rates compatible with time-critical manufacturing processes, for example, production of flat glass by the well-known float method. Those skilled in the art have continued to search for a method of producing gallium oxide films meeting the above-noted criteria in order to have available, affordable films for optical thin film stack designs.

SUMMARY OF THE INVENTION

In accordance with the present invention, there is provided a chemical vapor deposition process for laying down a gallium oxide coating on a hot glass substrate using a precursor gas mixture containing an inorganic gallium halide, an organic ester, and optionally including molecular oxygen.

Preferably, the present invention provides a process for depositing a gallium oxide coating on hot glass substrate comprising the steps of:

(a) preparing a precursor gas mixture containing an inorganic gallium halide and an organic ester for formation of gallium oxide, (b) maintaining said precursor gas mixture at a temperature below the temperature at which the gallium halide reacts to form the gallium oxide while delivering the mixture to a coating chamber opening onto the hot glass, (c) introducing the precursor gas mixture into the coating chamber whereby the mixture is heated to cause deposition of the gallium oxide, by incorporating oxygen from the organic ester onto the hot glass surface.

DESCRIPTION OF THE PREFERRED EMBODIMENT

It has been found that organic esters may be used as the source of oxygen, in combination with inorganic gallium halides to form gallium oxide coatings without requiring the presence of water vapor or gaseous oxygen, however, molecular oxygen may be used with some esters. Such organic esters containing 3-18 carbon atoms may be used with the invention, however, it is preferred to use organic esters containing from three to six carbon atoms, since larger molecules tend to be less volatile and hence less convenient for use in the CVD process of the present invention.

Esters useful as precursor materials in connection with the present invention can be described by the following formula:

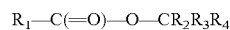

where $R_1$-$R_3$ are H, or a short chain, saturated organic group having 1 to 4 carbon atoms and $R_4$ is a short chain, saturated organic group having 1 to 4 carbon atoms.

Preferred esters for use as sources of oxygen in the practice of the present invention include, ethyl acetate, isobutyl acetate, n-butyl acetate and t-butyl acetate and ethyl formate. A particularly preferred organic source of oxygen is ethyl acetate.

The method of the present invention is generally practiced in connection with the formation of a continuous glass ribbon substrate, for example during a float glass production process. However, the method of the present invention may be employed in coating flat glass substrates in spray pyrolysis CVD coating systems.

While it is contemplated that the precursors could be combined at, or very near, the surface of the glass, the present invention involves the preparation of a precursor gas mixture which includes gallium chloride, particularly gallium trichloride ($GaCl_3$) and an organic ester; a carrier gas or diluent, for example, nitrogen, air or helium, will normally also be included in the gas mixture. Since thermal decomposition of the organic ester may initiate the gallium oxide deposition reaction at a high rate, it is desirable that the precursor mixture be kept at a temperature below the thermal decomposition temperature of the organic ester to prevent prereaction of the gaseous mixture resulting in formation of the gallium oxide.

The gaseous mixture is maintained at a temperature below that at which it reacts to form the gallium oxide, and is delivered to a location near a flat glass substrate to be coated, the substrate being at a temperature above the reaction temperature (and above the decomposition temperature of the organic ester in the precursor gas mixture).

The precursor gas mixture is thereafter introduced into the vapor space directly over the substrate. The heat from the substrate raises the temperature of the precursor gas above the thermal decomposition temperature of the organic oxygen compound. The organic ester then decomposes and by reaction with the gallium chloride, produces a gallium oxide coating on the substrate.

While the exact role of the organic ester in the deposition of gallium oxides from gallium trichloride has not been established, one plausible mechanism is as follows:
1. The ester undergoes an intra-molecular gas phase pyrolytic elimination to give the corresponding carboxylic acid and an olefin
2. The carboxylic acid produced in step 1 dehydrates intramolecularly, via further pyrolysis, to provide water and a ketene
3. The water generated in step 2 then reacts with gallium chloride to give gallium oxide via hydrolysis If the organic ester first reacts with gallium trichloride to give a Lewis acid-base complex, it does not necessarily preclude the proposed mechanism (steps 1-3) from taking place.

The present invention permits the production of gallium oxide coatings deposited on hot glass at a high deposition rate, preferably over 75 Å/second and more preferably over 100 Å/sec.

High deposition rates are important when coating substrates in a manufacturing process. This is particularly true for an on-line float glass process where the glass ribbon is traveling at a specific line speed and where a specific coating thickness is required. The deposition rates obtained with the preferred embodiments of the present invention may be two times higher than the deposition rate with other known methods for depositing gallium oxide coatings. Especially high deposition rates for gallium oxide may be achieved with the present invention using a precursor mixture including an ester having 3-6 carbon atoms.

The deposition rate is dependent upon the particular organic ester used, and the concentrations of both the organic ester and the gallium chloride, as well as the temperature of the glass. For any particular combination of compounds, the optimum concentrations (and in particular the optimum proportion of the organic ester to gallium chloride) and flow rates for rapid coating deposition may be determined by simple trial. However, it will be appreciated that the use of higher concentrations of reactants and high gas flow rates is likely to result in a less efficient overall conversion of the reactants into a coating, so that the optimum condition for commercial operation may differ from the conditions which provide the highest deposition rates.

The method of the invention permits the production, at high rates, of gallium oxide coatings on hot flat glass substrates on line during the glass production process. The gallium oxide coatings produced by the inventive method have been found to have intermediate refractive indices in the range of 1.7-1.95, permitting the achievement of desired optical effects, especially when used in combination with other coating layers. The gallium oxide coatings may be doped, for example with fluorine, to alter the optical constants of the coating.

A float glass installation may be utilized as a means for practicing the method of the present invention. The float glass apparatus more particularly comprises a canal section along which molten glass is delivered from a melting furnace to a float bath section wherein a continuous glass ribbon is formed in accordance with the well known float process. The glass ribbon advances from the bath section through an adjacent annealing lehr and a cooling section. The continuous glass ribbon serves as the substrate upon which the gallium oxide coating is deposited in accordance with the present invention.

The float section includes a bottom section within which a bath of molten tin is contained, a roof, opposite sidewalls, and end walls. The roof, side walls, and end walls together define an enclosure in which a non-oxidizing atmosphere is maintained to prevent oxidation of the molten tin.

Additionally, gas distributor beams are located in the bath section. The gas distributor beams in the bath section may be employed to apply additional coatings onto the substrate prior to applying the gallium oxide coating by the method of the present invention. The additional coatings may include silicon and silica.

In operation, the molten glass flows along the canal beneath a regulating tweel and downwardly onto the surface of the tin bath in controlled amounts. On the tin bath the molten glass spreads laterally under the influences of gravity and surface tension, as well as certain mechanical influences, and it is advanced across the bath to form the ribbon. The ribbon is removed over lift out rolls and is thereafter conveyed through the annealing lehr and the cooling section on aligned rolls. The application of the coating of the present invention may take place in the float bath section, or further along the production line, for example in the gap between the float bath and the annealing lehr, or in the annealing lehr.

A suitable non-oxidizing atmosphere, generally nitrogen or a mixture of nitrogen and hydrogen in which nitrogen predominates, is maintained in the bath enclosure to prevent oxidation of the tin bath. The atmosphere gas is admitted through conduits operably coupled to a distribution manifold. The non-oxidizing gas is introduced at a rate sufficient to compensate for normal losses and maintain a slight positive pressure, on the order of about 0.001 to about 0.01 atmosphere above ambient atmospheric pressure, so as to prevent infiltration of outside atmosphere. For purposes of the present invention the above-noted pressure range is considered to constitute normal atmospheric pressure. Heat for maintaining the desired temperature regime in the tin bath and the enclosure is provided by radiant heaters within the enclosure. The atmosphere within the lehr is typically atmospheric air, as the cooling section is not enclosed and the glass ribbon is open to the ambient atmosphere. Ambient air may be directed against the glass ribbon as by fans in the cooling section. Heaters may also be provided within the annealing lehr for causing the temperature of the glass ribbon to be gradually reduced in accordance with a predetermined regime as it is conveyed therethrough.

Gas distributor beams are, generally, positioned in the float bath to deposit the various coatings on the glass ribbon substrate. The gas distributor beam is one form of reactor that can be employed in practicing the process of the present invention.

A conventional configuration for the distributor beams suitable for supplying the precursor materials in accordance with the invention is, generally, an inverted generally channel-shaped framework formed by spaced inner and outer walls and defining at least two enclosed cavities. A suitable heat exchange medium is circulated through the enclosed cavities in order to maintain the distributor beams at a desired temperature.

The precursor gas mixture is supplied through a fluid cooled supply conduit. The supply conduit extends along the distributor beam and admits the gas through drop lines spaced along the supply conduit. The supply conduit leads to a delivery chamber within a header carried by the framework. Precursor gases admitted through the drop lines are discharged from the delivery chamber through a passageway toward a coating chamber defining a vapor space opening onto the glass where they flow along the surface of the glass.

Baffle plates may be provided within the delivery chamber for equalizing the flow of precursor materials across the distributor beam to assure that the materials are discharged against the glass in a smooth, laminar, uniform flow entirely across the distributor beam. Spent precursor materials are collected and removed through exhaust chambers along the sides of the distributor beam.

Various forms of distributor beams used for chemical vapor deposition are suitable for the present method and are known in the prior art.

One such alternative distributor beam configuration generally introduces the precursor gas mixture through a gas supply duct where it is cooled by cooling fluid circulated through cooling ducts. The gas supply duct opens through an elongated aperture into a gas flow restrictor.

The gas flow restrictor comprises a plurality of metal strips longitudinally crimped in the form of a sine wave and vertically mounted in abutting relationship with one another extending along the length of the distributor. Adjacent crimped metal strips are arranged "out of phase" to define a plurality of vertical channels between them. These vertical channels are of small cross-sectional area relative to the cross-sectional area of the gas supply duct, so that the gas is released from the gas flow restrictor at substantially constant pressure along the length of the distributor.

The coating gas is released from the gas flow restrictor into the inlet side of a substantially U-shaped guide channel generally comprising an inlet leg, a coating chamber which opens onto the hot glass substrate to be coated, and an exhaust leg, whereby used coating gas is withdrawn from the glass. The rounded corners of the blocks defining the coating channel promote a uniform laminar flow of coating parallel to the glass surface across the glass surface to be coated.

The following examples (in which gas volumes are expressed under standard conditions, i.e. one atmosphere pressure and ambient temperature, unless otherwise stated) which constitute the best mode presently contemplated by the inventors for practicing the invention, are presented solely for the purpose of further illustrating and disclosing the present invention, and are not to be construed as a limitation on, the invention:

EXAMPLES

Example 1

The following experimental conditions are applicable to Example 1-3.

A laboratory furnace having a moving conveyor to move a glass sheet, or sheets, through said furnace at a rate of 125-150 inches/minute (ipm), also contains a single, 10-inch wide, bi-directional coater, the coater being suitable for conveying vaporized reactants to the surface of the glass sheets in order to form a film or film stack by chemical vapor deposition.

The glass sheets are heated to approximately 1170° F., while the coater, at the reactor face, i.e., the portion nearest the glass surface is at a temperature of approximately 500° F.

Total gas flow was essentially 32 standard liters per minute (slm).

Preparation of the various precursor materials is accomplished by utilizing multiple source chambers known as "bubblers", there being one for each of ethyl acetate (EtOAc) and gallium trichloride ($GaCl_3$) which are maintained at specific temperatures. Helium gas is introduced into the bubbler, at a particular flow rate.

Table 1 summarizes the deposition conditions and the resulting film thickness for the examples. Film thickness was determined optically.

TABLE 1

| Example | % $GaCl_3$ | % EtOAc | % O2 | % HF | Thickness (Å) | Line speed (ipm) | Growth rate (Å/s) |
|---|---|---|---|---|---|---|---|
| 1 | 1.5 | 5 | 0 | 0 | 392 | 125 | 82 |
| 2 | 2 | 10 | 22 | 0 | 538 | 150 | 135 |
| 3 | 2 | 10 | 22 | 1.3 | 456 | 150 | 114 |

As can be seen from the data of Table 1, acceptable deposition rates may be achieved utilizing the method of the present invention using only gallium trichloride and ethyl acetate (Example 1). Examples 2 and 3 show even higher deposition rates with the inclusion of molecular oxygen alone, and molecular oxygen in combination with hydrofluoric acid added to gallium trichloride and ethyl acetate. These deposition rates were achieved even though the line speed of the substrate for Examples 2 and 3 was increased over that for Example 1.

The various reactants described above are combined in the coater to deposit a gallium oxide coating on, in this case, a clear soda-lime-silica glass sheet whereon a $SiO_2$ layer 200 Å thick had previously been deposited.

Addition of molecular $O_2$ and/or HF to the gaseous mixture may allow one to change the optical constants of the resulting gallium oxide coating as observed in Table 2.

TABLE 2

| Example | % O2 | % HF | $n_{vis}$ (400–800 nm) | $k_{vis}$ (400–800 nm) |
|---|---|---|---|---|
| 1 | 0 | 0 | 1.748 | 5.69E-09 |
| 2 | 22 | 0 | 1.853 | 1.14E-06 |
| 3 | 22 | 1.3 | 1.903 | 1.67E-05 |

$n_{(vis)}$ is the average refractive index from 400 to 800 nm.
$k_{(vis)}$ is the average extinction coefficient from 400 to 800 nm.

The data of Table 2 suggests that optical properties such as $n_{(vis)}$ and $K_{(vis)}$ may be altered or "tuned" by the addition of optional precursors, molecular oxygen and hydrofluoric acid.

The uniform, gaseous reactant mixture which is delivered to the surface of the hot glass substrate in accordance with the invention preferably includes (all percentages being mole %) from about 0 to about 40% oxygen, from about 1.5 to about 25% organic ester, and from about 0.5% to about 5% gallium halide, and most preferably includes from about 10 to about 30% oxygen, from about 3 to about 15% organic ester, and from about 1% to about 3% gallium halide.

It has also been noted to be preferable, when forming the gallium oxide coating in accordance with this invention, to apply a layer of a material which acts as a sodium diffusion barrier between the glass substrate and the gallium oxide coating. Coated glass articles have been found to exhibit lower haze when the gallium oxide coating deposited in accordance with the invention is applied to the glass with a sodium diffusion layer therebetween, as opposed to directly on the glass. This sodium diffusion layer is preferably formed of silica. The layer of silica is preferably formed using conventional CVD techniques.

In a more preferred embodiment, a thin film of tin oxide is first deposited on the surface of the hot glass substrate, with a thin film of silica deposited thereover, so that and underlayer structure of tin oxide/silica is formed intermediate the glass and the subsequently deposited layer of gallium oxide. In this embodiment, the silica film not only acts as a sodium diffusion barrier but, in combination with the first (undoped) tin oxide film, helps to suppress iridescence in the resulting coated glass article. The use of such anti-iridescent layers is disclosed in U.S. Pat. No. 4,377,613, which is incorporated herein in its entirety by reference thereto.

It must be noted that the process conditions are not sharply critical for the successful combining and delivering of vaporized reactants according to the present invention. The process conditions described hereinabove are generally disclosed in terms which are conventional to the practice of this invention. Occasionally, however, the process conditions as described may not be precisely applicable for each compound included within the disclosed scope. Those compounds for which this occurs will be readily recognizable by those ordinarily skilled in the art. In all such cases, either the process may be successfully performed by conventional modifications known to those ordinarily skilled in the art, e.g., by increasing or decreasing temperature conditions, by varying rates of combination of the reactants, by routine modifications of the vaporization process conditions, etc., or other process conditions which are otherwise conventional will be applicable to the practice of the invention.

It will also be noted that the process of the invention may be repeated as desired on a given substrate so as to form a coating consisting of several successive layers, the composition of each layer not necessarily being identical. It is, of course, obvious that for a given flow rate of the reactants, the thickness of a coating layer depends on the rate of movement of the substrate. Under these conditions, the reaction stations may, if desired, be multiplied by juxtaposing two or more coating devices. In this way, successive layers are superimposed before the layers have had time to cool, producing a particularly homogeneous overall coating.

The invention has been disclosed in what is considered to be its preferred embodiment. It must be understood, however, the specific embodiments are provided only for the purpose of illustration, and that the invention may be practiced otherwise than as specifically illustrated without departing from its spirit and scope.

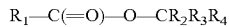

What is claimed is:

1. A chemical vapor deposition process for deposition of a gallium oxide coating on a hot glass substrate comprising:
   preparing a precursor gas mixture containing an inorganic gallium halide and an organic ester for formation of gallium oxide;
   maintaining the precursor gas mixture at a temperature below the temperature at which the gallium halide reacts to form the gallium oxide while delivering the mixture to a coating chamber opening onto the hot glass; and
   introducing the precursor gas mixture into the coating chamber, whereby the mixture is heated to cause deposition of the gallium oxide incorporating oxygen from the organic ester, onto the hot glass surface, wherein said gallium oxide coating has a refractive index of about 1.7-1.95.

2. The process for depositing the gallium oxide on the substrate as recited in claim 1, wherein the organic ester is of the form $$R_1-C(=O)-O-CR_2R_3R_4$$

wherein $R_1$-$R_3$ are H or a short-chain saturated organic group having 1 to 4 carbon atoms and $R_4$ is a short-chain, saturated organic group having 1 to 4 carbon atoms.

3. The process for depositing the gallium oxide coating on the substrate as recited in claim 1, wherein the organic ester is selected from the group consisting of: ethyl acetate, isobutyl acetate, n-butyl acetate, and t-butyl acetate and ethyl formate.

4. The process for depositing the gallium oxide coating on the substrate as recited in claim 1, wherein the substrate is a float glass ribbon.

5. The process for depositing the gallium oxide coating on hot float glass as recited in claim 4, wherein the precursor gas mixture flows over the float glass ribbon to be coated under laminar flow conditions.

6. The process for depositing the gallium oxide coating on the substrate as recited in claim 4, wherein said hot glass surface is at a temperature in the range of about 1100°-1320° F./590° C.-715° C.

7. The process for depositing the gallium oxide coating on the substrate as recited in claim 1, wherein the inorganic gallium halide is gallium trichloride.

8. The process for depositing the gallium oxide coating on the glass substrate as recited in claim 7, wherein the gallium trichloride in the precursor gas mixture is at a concentration of about 0.5-5% by volume.

9. The process for depositing the gallium oxide coating on the glass substrate as recited in claim 8, wherein the organic ester in the precursor gas mixture is at a concentration of about 3 to 10 times the concentration of the gallium trichloride.

10. The process for depositing the gallium oxide coating as recited in claim 1, wherein the gallium oxide is deposited onto the hot glass at a deposition rate greater than or equal to 75 Å/sec.

11. The process for depositing the gallium oxide coating as recited in claim 10, wherein the gallium oxide is deposited onto the hot glass at a deposition rate greater than or equal to 100 Å/sec.

12. The process for depositing the gallium oxide coating on the glass substrate as recited in claim 1, wherein the organic ester is ethyl acetate and said substrate is a float glass ribbon.

13. The process for depositing the gallium oxide coating on the substrate as recited in claim 1, wherein the substrate has a silica coating thereon, and the gallium oxide coating is deposited over the silica coating.

14. A chemical vapor deposition process for depositing a gallium oxide coating on a hot glass substrate comprising:
   pre-mixing a uniform, precursor gas mixture containing an inorganic gallium halide and an organic ester having 3-6 carbon atoms;
   delivering the precursor gas mixture at a temperature below the thermal decomposition temperature of the organic ester to a location adjacent the hot glass substrate to be coated, the substrate being at a temperature above the thermal decomposition temperature of the organic ester, and the atmosphere surrounding the substrate is at, essentially, atmospheric pressure; and
   introducing the precursor gas mixture into a vapor space above the substrate wherein the organic ester thermally decomposes, and, thereby initiates a reaction with the gallium halide to produce a gallium oxide coating on the substrate at a deposition rate greater than or equal to 100 Å/sec., the gallium oxide coating having a refractive index of about 1.7-1.95.